June 19, 1951 — A. VAUTIER — 2,557,522
AERODYNES EQUIPPED WITH REACTION JET PROPULSION MEANS
Filed May 28, 1947
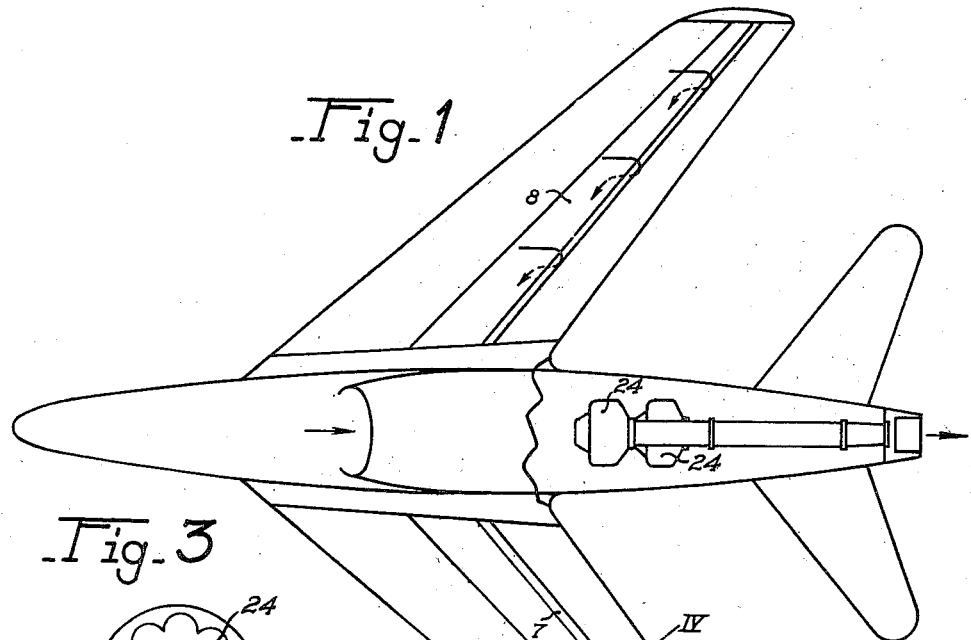
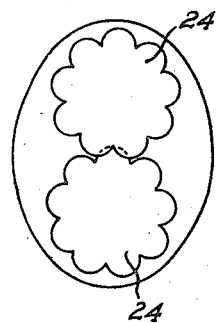
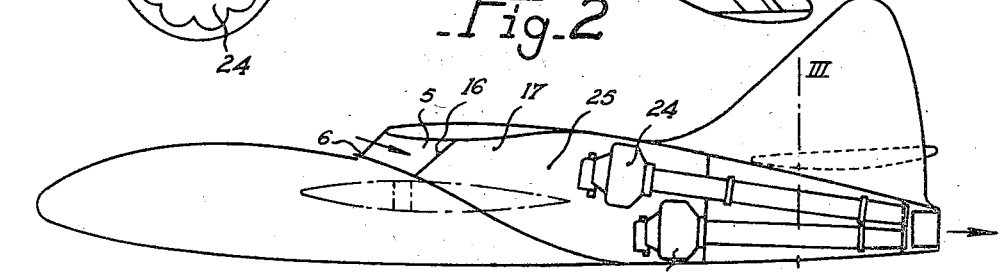
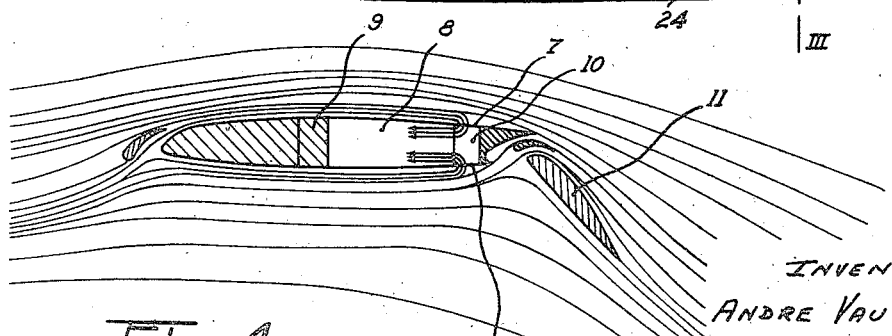
INVENTOR
ANDRE VAUTIER
BY:
Haseltine, Lake & Co.
AGENTS Patented June 19, 1951

2,557,522

UNITED STATES PATENT OFFICE 2,557,522

AERODYNES EQUIPPED WITH REACTION JET PROPULSION MEANS

André Vautier, Paris, France, assignor to Societe Nationale de Constructions Aeronautiques du Sud-Est, Paris, France Application May 28, 1947, Serial No. 751,053
In France May 28, 1946

2 Claims. (Cl. 244—74)

The present invention relates to aerodynes equipped with reaction jet propulsion means and its object is to provide improvements therein adapted to enhance the advantages and eliminate the drawbacks thereof.

The use of reaction jet propulsion means allows a greater freedom in the aero-dynamic design of an aerodyne to which the same are applied as compared to engine-propelled units with air-screws. This is so because in determining the location of said propulsion means, it is not necessary to take care of a ground clearance for the propeller.

Another object of the invention is to derive maximum benefit from the above-mentioned advantage as regards the location of the reaction jet propulsion units. To that end, it consists in disposing the latter in such a way as to satisfy both optimum lift drag ratio conditions in the aerodyne and conditions most favourable to the organisation of the means enabling the use of the air suction at the intake of the reaction jet units to produce the hypersustentation effects on the wing surfaces. Thus, for an aerodyne provided with twin jet units and a single fuselage, both jet units may be arranged one above the other and offset so as to provide the smallest possible dimensions for the main transverse frame of the fuselage.

The accompanying drawings illustrate by way of example only one embodiment of an aircraft having two jet propulsion units and a single fuselage in which the above defined characteristics have been included. In the drawings:

Figure 1 is a diagrammatic plan view with partial section of the aircraft.

Figure 2 is a longitudinal cross-section of the fuselage.

Figure 3 is on a larger scale a cross-section on line III—III of Figure 2.

Figure 4 is on a larger scale a cross-section on line IV—IV of Figure 1.

The airplane shown is designed to operate at very high speeds with two jet-propulsion units; it is provided with a single fuselage, a wing surface having a high degree of back-sweep and a conventional tail unit.

According to the invention both propulsion units 24, such as turbo-jet engines are disposed within the fuselage one above the other and offset. They are located within a chamber 25 having an air inlet at the top of the fuselage and an outlet for the burnt gases at the rear frame of said fuselage. With such a disposition of the propulsion units, centering of the aircraft is facilitated by the backsweep type of wing which is operative to displace the center of aerodynamic thrust rearwards.

Further the maximum cross-section of the fuselage may be kept down at the minimum. With such an arrangement, the gain as to the area of the maximum cross-section with respect to a twin engine aircraft of similar load reaches up to 25%, whereby an important decreasing of the resistance to flight is obtained.

The known arrangement of the normal air intake to the propulsion units at the top of the fuselage firstly, entirely frees the lower part of the fuselage and the zone of the connection with the wing, and, secondly, does not restrict the visibility of the pilot wherein the cockpit of the airplane is provided in coincidence with the apex line of the backswept wings. The lower part of the fuselage may thus, in military craft, be used to house bomb-releasing gear with the flap-doors therefor, or various armament devices.

The arrangement and the location of said air intake allow to suck the boundary layer of air which is generated ahead of said air intake. A diverging inlet 5 is provided at the intake of the air to the power units and the suction of the boundary layer is produced as at 6 ahead of said diverging inlet.

Longitudinal suction slots 7 are further provided, in a known manner, at the rear portion of the lower and upper wing surfaces, and a channel 8 is formed inside the wings to convey the air aspirated through the slot 7 to the intake of the propulsion unit. This channel may for example be included between the wing spar and a false spar supporting the normal hypersustentation devices. It may be enough in certain cases to provide only a single slot 7 either at the lower or the upper wing surface. Both propulsion units being operated at full power, there is thus produced, in addition to the aspiration of the boundary layer, a supplemental circulation of air with a high rate of flow.

It is thus possible to use the full power of the propulsion unit upon landing in order to maintain the aforesaid hypersustentation effects throughout the wing span. However, it is important at that time to suppress, as known, the propulsive thrust resulting from the exhaust jet of burnt gases.

This hypersustentation effect which it is thus possible to obtain is not required in normal flight, and in that case, it is desirable to suppress the additional circulation about the aerofoil section. To that end, means may be provided such as gate valves 16, controlled by the pilot and which make it possible according to their position either to place the suction chamber 17 at the air intake to the propulsion jets in communication with the diverging inlet 5 or to place said chamber in communication with the suction channels 8 in the wing.

Upon landing, with the propulsion units operating at full power to maintain the aforesaid supplemental air circulation, it is necessary to suppress the propulsive reaction applied to the airplane by using thrust spoiler for example.

What I claim as my invention and desire to secure by Letters Patent is:

1. The combination with an aircraft comprising a fuselage and a chamber within said fuselage open at its forward end, of two jet propulsion units disposed one above the other within said chamber and having their axes located in the longitudinal plane of symmetry of the fuselage, said units being longitudinally offset and having their axes relatively inclined in accordance with the longitudinal contour of the corresponding part of the fuselage, whereby, on one hand, the smallest area for the maximum cross-section of the fuselage is obtained and, on the other hand, accidental or voluntary stopping of one of said units does not generate a dissymmetrical propulsive action, and means for discharging said units in the rear of said fuselage.

2. The combination with an aircraft comprising a fuselage and a chamber within said fuselage open at its forward end, of two turbine jet engines disposed one above the other within said chamber and having their axes located in the longitudinal plane of symmetry of the fuselage, said turbine jet engines being longitudinally offset and having their axes relatively inclined in accordance with the longitudinal contour of the corresponding part of the fuselage, whereby, on one hand, the smallest area for the maximum cross-section of the fuselage is obtained and, on the other hand, accidental or voluntary stopping of one of said turbine jet engines does not generate a dissymmetrical propulsive action, and two distinct exhaust pipes respectively connected with said engines, disposed one above the other in said longitudinal plane of symmetry and opening in the rear of the fuselage.

ANDRÉ VAUTIER.

REFERENCES CITED

The following references are of record in the file of this patent:

UNITED STATES PATENTS

| Number | Name | Date |
|---|---|---|
| 1,375,601 | Morize | Apr. 19, 1921 |
| 1,986,064 | Leray | Jan. 1, 1935 |
| 2,041,792 | Stalker | May 26, 1936 |
| 2,380,535 | McDevitt | July 31, 1945 |
| 2,383,385 | Heintze | Aug. 21, 1945 |
| 2,390,161 | Mercier | Dec. 4, 1945 |
| 2,401,941 | Lee | June 11, 1946 |
| 2,412,646 | Northrop | Dec. 17, 1946 |
| 2,431,592 | Stalker | Nov. 25, 1947 |
| 2,477,637 | Mercier | Aug. 2, 1949 |
| 2,503,973 | Smith | Apr. 11, 1950 |

FOREIGN PATENTS

| Number | Country | Date |
|---|---|---|
| 209,435 | Great Britain | Nov. 27, 1924 |
| 512,064 | Great Britain | Aug. 29, 1939 |
| 518,663 | Great Britain | Mar. 5, 1940 |
| 568,667 | Great Britain | Apr. 16, 1945 |
| 866,952 | France | June 23, 1941 |
| 328,022 | Italy | July 23, 1935 |

OTHER REFERENCES

Ser. No. 396,458, Richard (A. P. C.), published May 25, 1943.

"Flight," Jan. 11, 1945, page 32.

"Aircraft Engineering," Feb. 1946, page 55.

"Aircraft Engineering," Mar. 1948, pages 76–77.

"Aviation News," May 27, 1946, Outside of back cover.

"Jane's All the World's Aircraft" for 1947, pages 223c and 224c.